United States Patent [19]

Seccia et al.

[11] Patent Number: 5,751,347
[45] Date of Patent: May 12, 1998

[54] VESTIGIAL SIDEBAND TEST SIGNAL GENERATOR AND METHOD

[75] Inventors: Joseph Lee Seccia; Edwin Ray Twitchell, both of Quincy, Ill.

[73] Assignee: Harris Corporation, Melbourne, Fla.

[21] Appl. No.: 622,672

[22] Filed: Mar. 26, 1996

[51] Int. Cl.[6] .................................................. H04N 17/00
[52] U.S. Cl. .......................... 348/181; 348/192; 348/390; 375/224
[58] Field of Search ............................ 348/181, 192, 348/180, 390; 375/224, 227, 231, 229, 348, 346

[56] References Cited

U.S. PATENT DOCUMENTS

| | | | |
|---|---|---|---|
| 3,715,666 | 2/1973 | Mueller et al. | 375/224 |
| 4,141,072 | 2/1979 | Perreault | 364/553 |
| 5,119,196 | 6/1992 | Ayanoglu et al. | 348/607 |
| 5,353,307 | 10/1994 | Lester et al. | 375/224 |

OTHER PUBLICATIONS

"VSB Transmission System", Grand Alliance pp. 1–24, Sep. 1994.

*Primary Examiner*—Victor R. Kostak
*Attorney, Agent, or Firm*—Rogers & Killeen

[57] ABSTRACT

A test signal generator presents a test signal of pseudorandom data in a format which simulates the Grand Alliance Transmission Layer Signal for the 8- or 16- vestigial sideband (8/16-VSB) signal for Advanced Television (ATV) systems. An actual (non-test) Transmission Layer 8/16-VSB signal for ATV is in a particular format with properly formatted sync information and includes data which have been randomized, Reed-Solomon coded, interleaved, and trellis coded. The test signal generator provides data in the particular 8/16-VSB format which simulates the Grand Alliance transmission signal.

21 Claims, 4 Drawing Sheets

VESTIGIAL SIDEBAND TEST SIGNAL GENERATOR AND METHOD

BACKGROUND OF THE INVENTION

The present invention relates to devices and methods for generating test signals which simulate known signals having a specific format, and more particularly to a device and method for generating a test signal which includes sync symbols and pseudorandom numbers in specific portions to thereby simulate a known signal.

Some transmission systems transmit highly complex signals which include specific types of information in specified locations. The test signals which are used to test such systems must simulate the highly complex signals in order to provide a realistic test. By way of example, one such transmission system is the 8- or 16- vestigial sideband (8/16-VSB) digital transmission system which is suitable for data transmission over a variety of media and for use with the Grand Alliance Advanced Television (ATV) system.

The ATV VSB transmission system is known and need not be described in detail. By way of background, the 8-VSB system may operate in a broadcast mode with 8-level symbols (3 bits per symbol) and the 16-VSB system may operate in higher data rate cable mode with 16-level symbols (4 bits per symbol.) Data are received serially and randomized, forward-error-corrected (FEC) using a Reed-Solomon coding technique, interleaved and trellis coded. The format for this Transmission Layer signal is a data frame which includes sync signals, such as illustrated in FIG. 1. A data frame for the Transmission Layer 8-VSB system includes 626 segments which are each 832 symbols long. The first 4 symbols in each segment are segment sync symbols. Segments which convey data are in the format shown in FIG. 2, where the data is formatted in the manner discussed above (randomized and coded.) The data segments include the FEC codes. Certain segments (the first and 314th in the 8-VSB format) include field sync information and are in the format shown in FIG. 3.

With reference to FIG. 3, the field sync segments include the four segment sync symbols followed by 511 symbols of pseudorandom numbers (pseudorandom numbers simulate a random signal in that their density function approaches a Gaussian distribution, but are not entirely random in that the signal is deterministic and is based upon a high order polynomial generating function.) These are followed by three sequences of 63 pseudorandom numbers (the middle sequence being inverted in every other field sync, in other words the middle sequence in field sync #2 in FIG. 1 is inverted with respect to the middle sequence of field sync #1), which are followed by 24 symbols that describe the VSB mode, by 92 symbols which have not yet been assigned a purpose, and by 12 symbols which repeat the last 12 symbols of the previous segment. The pseudorandom numbers may be generated by a polynomial generator with a specified preload (e.g., $X^6+X+1$ with preload 100111 for the 63 symbols).

A test signal which simulates the Transmission Layer 8/16-VSB signal necessarily includes data frames which incorporate all of the above in the proper sequence. For example, each segment must include the segment sync symbols at the beginning, and each field sync segment must include all of the proper symbols in their appropriate location. Further, each data frame should include psuedorandom data.

Accordingly, it is an object of the present invention to provide a novel device and method for generating a test signal which simulates a real signal which has a specified format.

It is another object of the present invention to provide a novel device and method for generating a test signal which simulates a real signal in a specified format where the data are pseudorandom.

It is still another object of the present invention to provide a novel device and method for generating a test signal which simulates an unmodulated, unfiltered, 8/16-level, 8/16-VSB signal for a Grand Alliance ATV television signal transmission system.

It is a further object of the present invention to provide a novel device and method for generating data segments of a test signal data frame in which a counter indicates when sync symbols and pseudorandom symbols are to be generated and in which the generated symbols are multiplexed to provide a test signal which simulates the specified format of a data segment of a real signal.

It is yet a further object of the present invention to provide a novel device and method for generating a field sync segment of a test signal data frame in which sync symbols and pseudorandom and nonrandom symbols are generated and in which the generated symbols are multiplexed to provide a test signal which simulates the specified format of a field data segment of a real signal.

It is still a further object of the present invention to provide a novel method and test signal generator for providing a test signal in a format which simulates a real signal of M symbols which has certain of the symbols which are sync symbols and other of the symbols which are data symbols, and in which the test signal generator includes a counter for providing a symbol count at a rate which simulates the real signal, a logic unit for generating instructions upon receipt of predetermined ones of the symbol count, a sync symbol generator for generating the sync symbols upon receipt of predetermined ones of the instructions and a pseudorandom number generator for generating pseudorandom symbols upon receipt of other predetermined ones of the instructions, and a multiplexer for combining the sync symbols and the pseudorandom symbols to provide an output which simulates the real signal.

These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

In a preferred embodiment of the present invention, a test signal generator presents a test signal of pseudorandom data in a format which simulates the Grand Alliance 8-vestigial sideband (8-VSB) signal for Advanced Television (ATV) systems. An actual (non-test) Transmission Layer 8-VSB signal for ATV is in a particular format with properly formatted sync information and includes data which have been randomized, Reed-Solomon coded, interleaved, and trellis coded. The test signal generator herein provides data in the particular 8-VSB format which simulates the Grand Alliance transmission signal. As will apparent to those of skill in the art, the design of the generator herein may be expanded to simulate the 16-VSB format.

Figure 4:
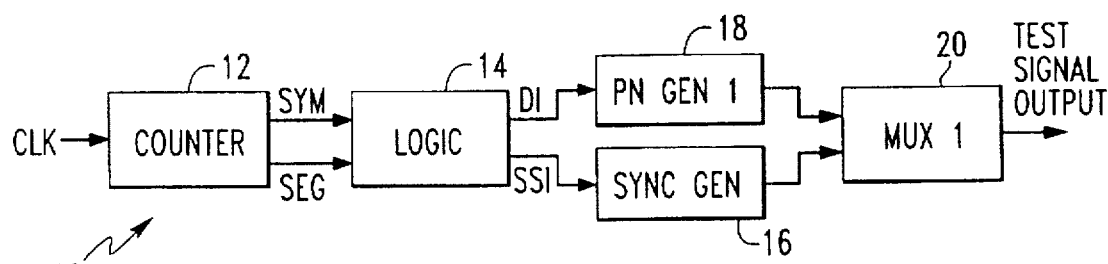
FIG. 4 is a block diagram of an embodiment of the present invention.
Figure 8:
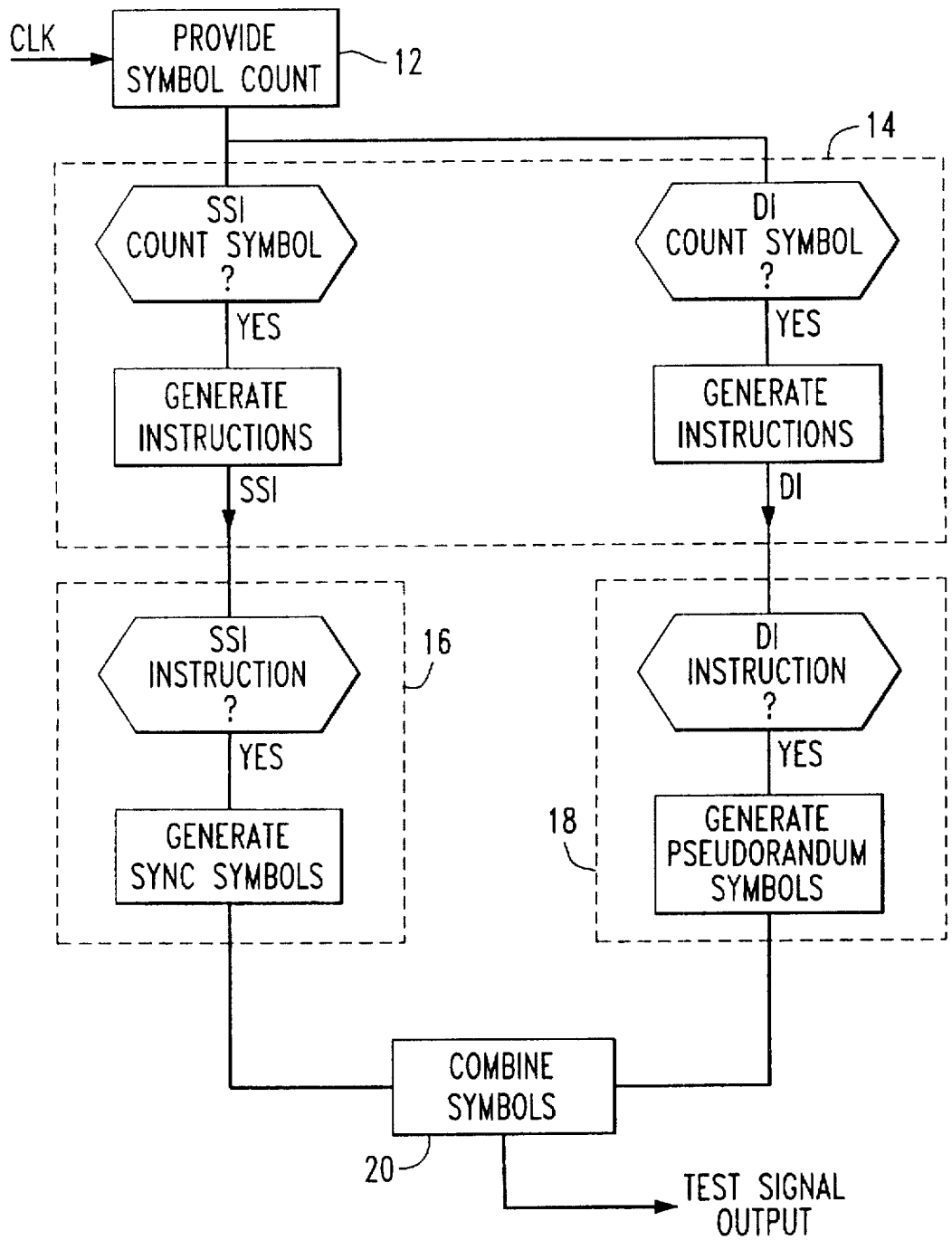
FIG. 8 is a block diagram of one method embodiment of the present invention.

With reference to FIGS. 4 and 8, a preferred embodiment of the test signal generator 10 may include a counter 12 for providing a symbol count (SYM) at a rate which simulates symbol transmission in the real signal and a segment count (SEG) for each segment, a logic unit 14 for generating instructions upon receipt of predetermined ones of the symbol count, a sync symbol generator 16 for generating the sync symbols upon receipt of segment sync the instructions (SSI), a pseudorandom number generator 18 for generating pseudorandom symbols upon receipt of data instructions (DI), and a multiplexer 20 for combining the sync symbols and the pseudorandom symbols to provide an output which simulates the real signal.

Figure 1:
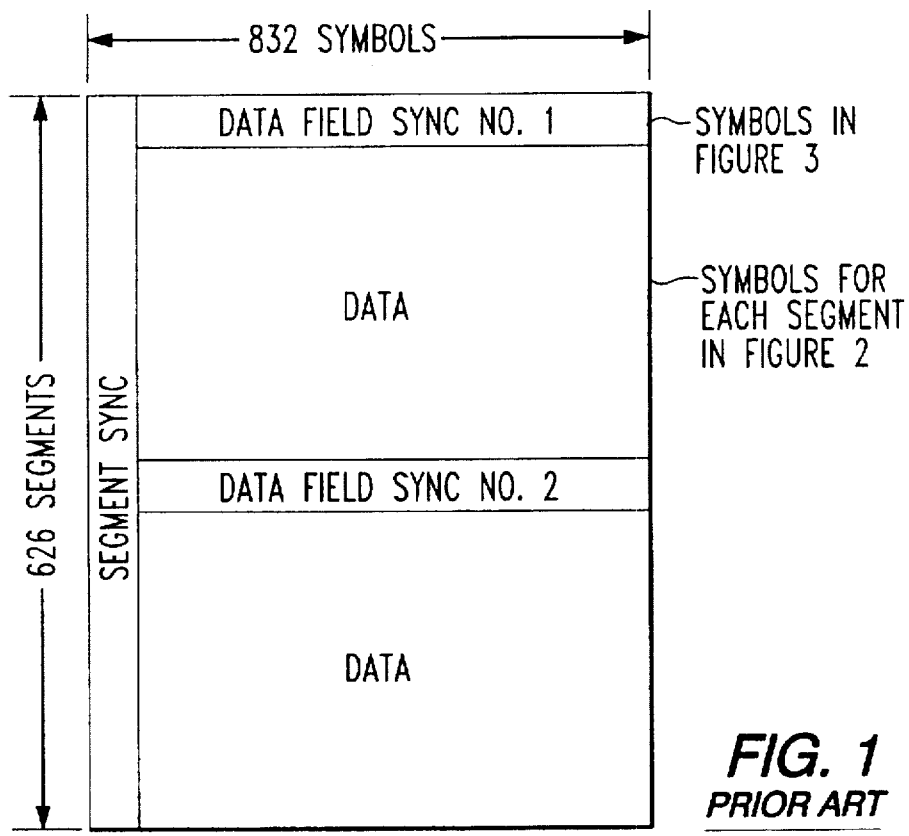
FIG. 1 is a diagram of a data frame of a 8-VSB signal of the prior art.
Figure 5:
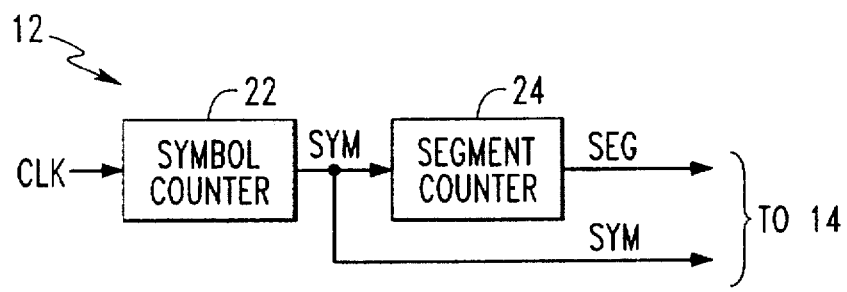
FIG. 5 is a block diagram of an embodiment of the counter of FIG. 4.

A preferred embodiment of counter 12 is illustrated in FIG. 5. A conventional counter 22 may count clock signals to provide a symbol count, and a conventional counter 24 may count the symbol count to provide a segment count.

Logic unit 14 may be any conventional processor capable of receiving count inputs and providing enabling signals at predetermined counts. Symbol generators 16 and 18 and multiplexer 20 may also be conventional.

By way of further explanation, operation of the test signal generator may include the provision of a clock signal (CLK) which simulates the rate at which symbols in the real signal are transmitted. Each of the clock signals triggers a symbol count, and the correct number of symbol counts trigger a segment count (that is, where each segment has 832 symbols, a segment count will be triggered and the symbol count reset to zero when the symbol count reaches 832.) Logic unit 14 generates instructions at specific counts. For example, when the segment being simulated is a data segment, a segment sync instruction for causing sync generator 16 to generate four sync symbols may be generated when the symbol count is one, and an instruction for causing pseudorandom number generator 18 to generate plural pseudorandom numbers may be generated when the symbol count is five. Logic unit 14 may include all of the appropriate symbol counts for enabling symbol generators at the appropriate times, and may include specific symbol counts for specific segments to simulate a data frame of any arrangement. Multiplexer 20 may combine the symbols from the symbol generators to thereby present a data frame which simulates the one in the real signal.

Figure 6:
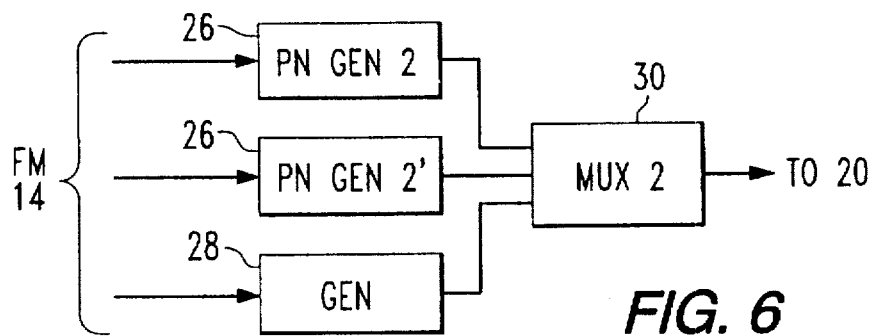
FIG. 6 is a block diagram of further symbol generators which may be added to the embodiment of FIG. 4.

Some data frames, such as those of the 8-VSB signal, may be more efficiently simulated by providing separate symbol generators for parts of the data frame. For example, and with reference to FIG. 6, further pseudorandom number generators 26 and nonrandom number generator 28 may receive specific instruction signals from logic unit 14 and provide appropriate symbols through a second multiplexer 30 to multiplexer 20 for inclusion in the simulated signal.

Figure 2:
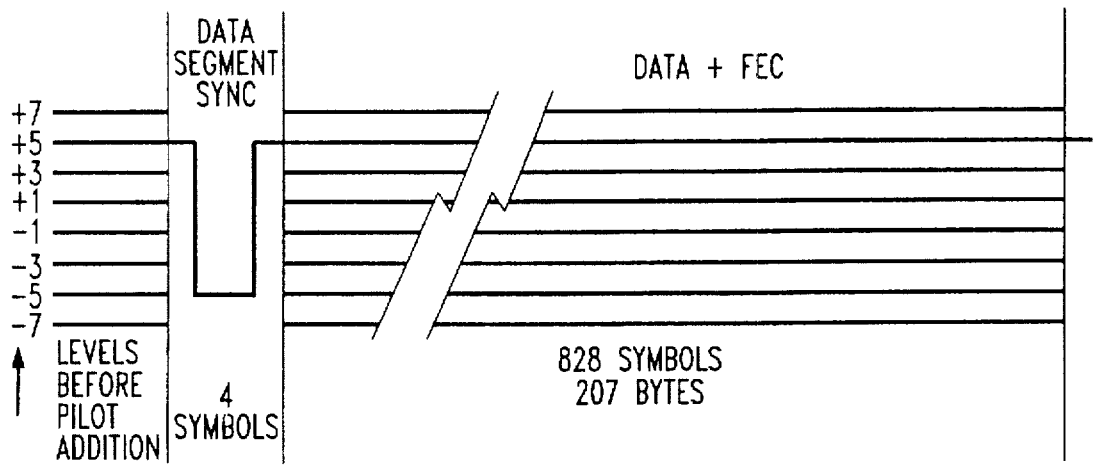
FIG. 2 is a diagram of a data segment of the data frame of FIG. 1.
Figure 3:
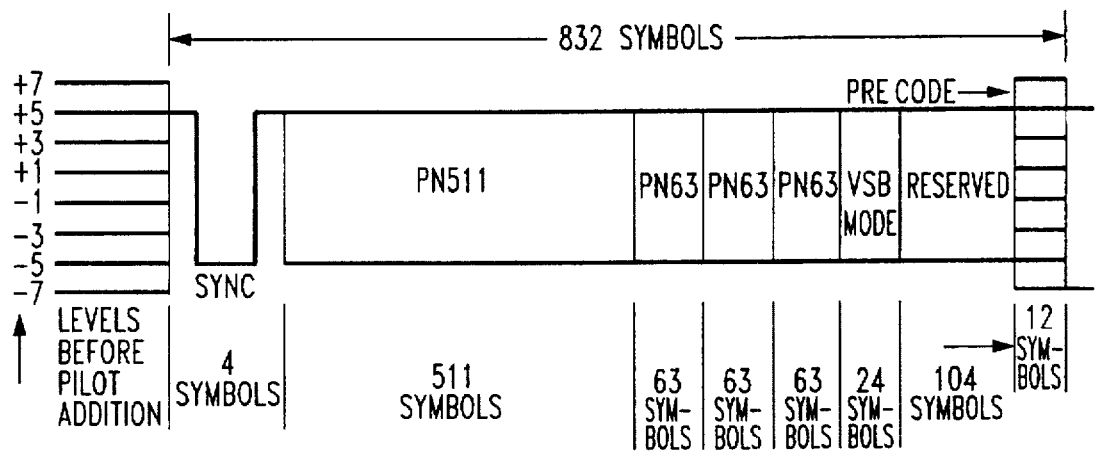
FIG. 3 is a diagram of a field sync segment of the data frame of FIG. 1.
Figure 7:
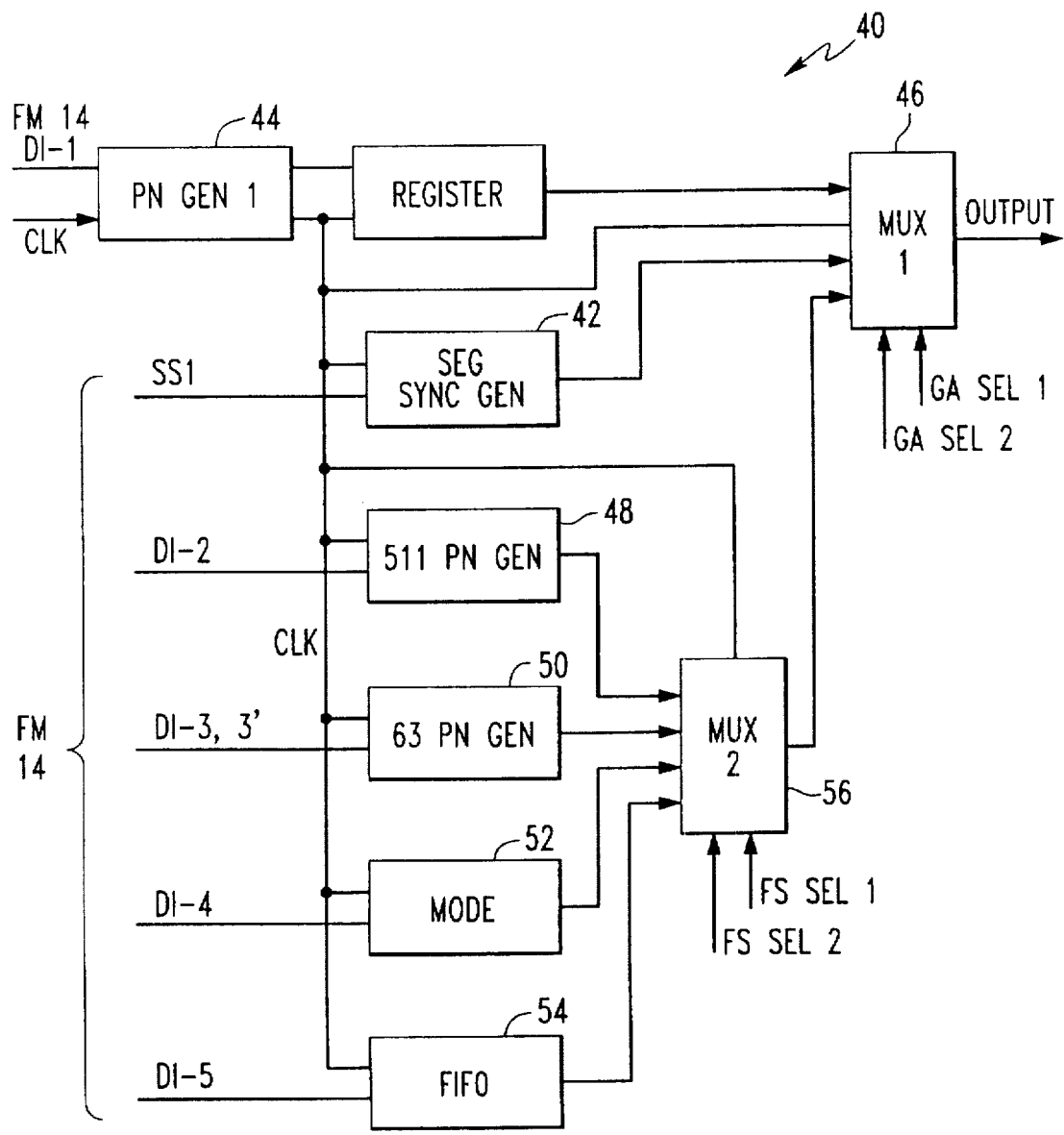
FIG. 7 is a block diagram of a further embodiment of the present invention illustrating the symbol generators and multiplexers for emulating a 8-VSB signal.

Returning to the example of the 8-VSB signal, the segments depicted in FIGS. 2 and 3 may be simulated using a device 40 depicted in FIG. 7 which omits counter 12 and logic unit 14 in the interest of clarity. With reference also to Table 1 below, consider first a data segment from FIG. 2 (that is, a segment other than field sync segments which are segment numbers 1 and 314 in the 8-VSB signal.) Upon receipt of a symbol count of 1 from counter 12, logic unit 14 provides a segment sync instruction (SSI) to segment sync symbol generator 42 which generates the four sync symbols which comprise the segment sync portion of the segment. A symbol count of five triggers provision of a first data instruction (DI-1) to pseudorandom number generator 44 which generates the 828 symbols of pseudorandom numbers which comprise the data portion of the segment. The sync symbols and the pseudorandom numbers are combined in first multiplexer 46 to provide an output which simulates the data segment of FIG. 2.

The field sync segment of FIG. 3 may be formed using additional number generators. When the segment count is 1 and 314 (the field sync segments) a symbol count of 1 initiates instruction SSI to segment sync symbol generator 42 which provides the first four sync symbols. A symbol count of five triggers data instruction DI-2 which causes pseudorandom number generator 48 to generate 511 pseudorandom numbers, followed by a count of 516 which triggers instruction DI-3 which causes pseudorandom number generator 50 to generate 63 pseudorandom numbers three times, followed by a count of 705 which triggers instruction DI-4 which causes number generator 52 to generate the 24 nonrandom symbols which comprise the mode indication (e.g., the 8-VSB, 3 bits per symbol, broadcast mode, or the 16-VSB, 4 bits per symbol cable mode), and followed by a count of 821 which triggers instruction DI-5 which causes number generator 54 to generate the 12 nonrandom symbols which comprise the precode symbols (these are the last 12 symbols from the previous data segment.) The second of the three sequences of 63 numbers may be inverted to match Grand Alliance specifications and a separate inversion instruction DI-3' may be provided for this purpose (in the Grand Alliance, inversion may be used for field sync identification.) Instruction DI-3 may be repeated to provide pseudorandom numbers to fill in the "reserved" portion of the field sync segment. Other symbols may be provided as needed, or to meet the symbol requirements of the "reserved" portion if these symbol generators are not adequate. A clock signal CLK may be provided to each component, and a second multiplexer 56 may combine symbols from generators 48–54.

TABLE 1

| INSTRUCTION | SYMBOL COUNT | SEGMENT COUNT |
| --- | --- | --- |
| SSI, SEG SYNC | 1–4 | ALL |
| DI-1, PN GEN 1 | 5–832 | ALL but 1 and 314 |
| DI-2, 511 PN GEN | 5–515 | 1, 314 |
| DI-3, 63 PN GEN | 516–704 | 1, 314 |
|  | 729–820 | 1, 314 |
| DI-3', 63 PN GEN INV | 578–640 | 314 |
| DI-4, MODE | 705–728 | 1, 314 |
| DI-5, FIFO | 821–832 | 1, 314 |

In the embodiment of FIG. 7, separate instructions may be provided to first multiplexer 46 and to second multiplexer 56 to facilitate proper combination of the symbols. The operation of the separate instructions, FS SEL 1 and 2 and GA SEL 1 and 2, may be seen from Table 2 below. Table 2 also takes into account a two symbol delay that is inserted into segment sync symbol generator 42 to match the timing of the data which is particular to this embodiment and may not be required in other embodiments.

TABLE 2

| INSTRUCTION | SYMBOL COUNT | SEGMENT COUNT |
|---|---|---|
| SEG SYNC | 1–4 | ALL |
| PN GEN 1 | ALWAYS ON | ALL |
| 511 PN GEN | 5–515 | 1, 314 |
| 63 PN GEN | 516–704 | 1, 314 |
|  | 729–820 | 1, 314 |
| 63 PN GEN INV | 578–640 | 314 |
| MODE | 705–728 | 1, 314 |
| FIFO | 821–832 | 1, 313, 314, 626 |
| FS SEL 1 | 518–822 | 1, 314 |
| FS SEL 2 | 707–730 | 1, 314 |
|  | 823–832 | 1, 314 |
|  | 1–2 | 2, 314 |
| GA SEL 1 | 3–6 | ALL |
| GA SEL 2 | 7–832 | 1, 314 |
|  | 1–2 | 2, 315 |

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. A test signal generator for providing a test signal in a format which simulates a real signal of M symbols which has certain of the symbols which are sync symbols and other of the symbols which are data symbols, the test signal generator comprising:

counter means for providing a symbol count at a rate which simulates the real signal;

logic means for generating instructions upon receipt of predetermined ones of the symbol count;

symbol generator means for generating the sync symbols upon receipt of predetermined ones of the instructions and for generating pseudorandom symbols upon receipt of other predetermined ones of the instructions; and means for combining the sync symbols and the pseudorandom symbols to provide an output which simulates the real signal.

2. The generator of claim 1 wherein said symbol generator comprises a sync symbol generator for providing m sync symbols at a beginning of each test signal.

3. The generator of claim 2 wherein said symbol generator comprises a first pseudorandom number generator for providing a plurality of pseudorandom numbers following the m sync symbols.

4. The generator of claim 2 wherein said symbol generator comprises plural second pseudorandom number generators, each for providing a plurality of pseudorandom numbers upon receipt of a different one of the instructions.

5. The generator of claim 4 wherein said symbol generator further comprises a nonrandom number generator for providing plural nonrandom numbers upon receipt of a different one of the instructions, and wherein said means for combining combines the plural nonrandom numbers with the m sync symbols and the plurality of pseudorandom numbers.

6. A test signal generator for presenting a test signal in a format which simulates a data signal having a multiplicity of data frames, each of the frames with N segments, and each of the N segments with M symbols, m of which are sync symbols, the test signal generator comprising:

means for providing clock signals;

counter means for providing a symbol count for each of the clock signals and for providing a segment count after M of the symbol count;

logic means for generating data instructions upon receipt of predetermined ones of the symbol count and for generating segment sync instructions upon receipt of predetermined ones of the segment count;

sync symbol generator means for generating m sync symbols upon receipt of a one of the segment sync instructions;

first pseudorandom number generator means for generating a plurality of pseudorandom numbers upon receipt of a one of the data instructions; and a first multiplexer for combining the m sync symbols and the pseudorandom numbers to provide an output which simulates the data signal.

7. The generator of claim 6 further comprising plural second pseudorandom number generator means, each for providing a plurality of pseudorandom numbers responsive to different ones of the data instructions.

8. The generator of claim 7 further comprising a second multiplexer for combining the pseudorandom numbers from said plural second pseudorandom number generator means and for providing the combination to said first multiplexer.

9. The generator of claim 8 wherein the data signal has ones of the N segments which are field sync segments, and wherein said logic means is further for providing ones of the data instructions which are field sync instructions indicating that the output is to be one of the field sync segments, and further wherein said plural second pseudorandom number generator means are for responding to the field sync instructions.

10. A test signal generator for presenting a test signal in a format which simulates a field sync segment of a data frame which has N segments, where each of the N segments has M symbols, some of which are pseudorandom, and the field sync segment is in predetermined ones of the N segments, the test signal generator comprising:

means for providing clock signals;

counter means for providing a symbol count for each of the clock signals and for providing a segment count after M of the symbol count;

logic means for generating data instructions upon receipt of predetermined ones of the symbol count and for indicating ones of the N segments for which the test signal is to be generated;

plural pseudorandom number generators, each for generating a plurality of pseudorandom numbers upon receipt of a different one of the data instructions, when the test signal is generated; and means for combining the pseudorandom numbers to provide an output which simulates the field sync segment.

11. The generator of claim 10 wherein the test signal simulates the field sync segment of the data frame of an 8-level vestigial sideband signal for a high definition television system.

12. The generator of claim 10 further comprising a sync symbol generator for generating m sync symbols at a beginning of each of the test signals.

13. The generator of claim 10 wherein the test signal further comprises nonrandom numbers and wherein the generator further comprises number generator means for generating a plurality of nonrandom numbers upon receipt of ones of the data instructions, when the test signal is generated, and wherein said means for combining is further for combining the nonrandom numbers to simulate the field sync segment.

14. The generator of claim 10 wherein the test signal simulates the field sync segment of the data frame of a Transmission Layer 8- or 16-vestigial sideband (8/16-VSB) signal for an Advanced Television (ATV) system, and comprising, two of said plural pseudorandom number generators, one for generating a predetermined sequence of 511 pseudorandom numbers upon receipt of a first of the data instructions, and the other for generating a predetermined sequence of 63 pseudorandom numbers upon receipt of second, third and fourth of the data instructions, and further comprising, a sync symbol generator for generating 4 sync symbols at a beginning of each test signal, a number generator for generating 24 nonrandom symbols indicating a 8-VSB or 16-VSB mode upon receipt of a fifth of the data instructions, and wherein said means for combining is for combining, in order, the 4 sync symbols, the 511 pseudorandom numbers, the 63 pseudorandom three times, the 24 nonrandom symbols and 92 further symbols from one of said plural pseudorandom number generators.

15. A method of generating a test signal in a format which simulates a real signal of M symbols which has certain of the symbols which are sync symbols and other of the symbols which are data symbols, the method comprising the steps of:

providing a symbol count at a rate which simulates the real signal;

generating instructions upon receipt of predetermined ones of the symbol count;

generating the sync symbols upon receipt of predetermined ones of the instructions;

generating pseudorandom symbols upon receipt of other predetermined ones of the instructions; and combining the sync symbols and the pseudorandom symbols to provide an output which simulates the real signal.

16. The method of claim 15 wherein the step of generating the sync symbols comprises the step of providing m of the sync symbols at a beginning of each test signal.

17. The method of claim 16 wherein the step of generating pseudorandom symbols comprises the step of providing a plurality of pseudorandom numbers following the m sync symbols.

18. The method of claim 16 wherein the step of generating pseudorandom symbols comprises the step of providing different pluralities of pseudorandom numbers upon receipt of different ones of the instructions.

19. The method of claim 18 further comprising the step of providing plural nonrandom numbers upon receipt of a different one of the instructions.

20. The method of claim 15 wherein the step of combining the sync symbols and the pseudorandom symbols provides an output which simulates a Transmission Layer signal of an 8/16-VSB signal for a television system.

21. The method of claim 20 wherein the step of generating pseudorandom symbols comprises the step of providing 511 pseudorandom numbers upon receipt of a first of the instructions, and providing 63 pseudorandom numbers upon receipt of second, third and fourth of the instructions, and wherein the step of generating the sync symbols comprises the step of providing 4 sync symbols at a beginning of each test signal, and further comprising the step of generating 24 nonrandom symbols indicating a 8-VSB mode upon receipt of a fifth of the instructions, and wherein the step of combining combines, in order, the 4 sync symbols, the 511 pseudorandom numbers, the 63 pseudorandom three times, the 24 nonrandom symbols and 92 further pseudorandom numbers.

* * * * *